United States Patent
Hsi

(10) Patent No.: US 6,854,482 B2
(45) Date of Patent: Feb. 15, 2005

(54) SAFE CASING

(76) Inventor: Shih Pei Hsi, 3F, No. 3, Alley 69, Lane 132, Rui Kuang Rd., Nei Hu Dist., Taipei (TW)

( * ) Notice: Subject to any disclaimer, the term of this patent is extended or adjusted under 35 U.S.C. 154(b) by 191 days.

(21) Appl. No.: 10/233,631

(22) Filed: Sep. 4, 2002

(65) Prior Publication Data

US 2004/0040604 A1 Mar. 4, 2004

(51) Int. Cl.$^7$ ............................................. F16K 11/24
(52) U.S. Cl. ................................ 137/606; 137/454.6
(58) Field of Search .............................. 137/606, 454.6, 137/487

(56) References Cited

U.S. PATENT DOCUMENTS

| | | | | |
|---|---|---|---|---|
| 4,170,245 A | * | 10/1979 | Haley | 137/487.5 |
| 4,248,263 A | * | 2/1981 | Langill et al. | 137/454.2 |
| 4,399,836 A | * | 8/1983 | de Versterre et al. | 137/487.5 |

* cited by examiner

Primary Examiner—Stephen M. Hepperle
(74) Attorney, Agent, or Firm—Rosenberg, Klein & Lee

(57) ABSTRACT

A safe casing includes a casing having an open space in one side, a solenoid valve device installed in a place of the open space, a low-voltage, low-current circuit control device installed in the other place of the open space and a sealing means. The open space of the casing is sealed by use of the sealing means after it is installed with such devices of solenoid valve and circuit control.

3 Claims, 4 Drawing Sheets

// SAFE CASING

BACKGROUND OF THE INVENTION

1. Field of the Invention

The present invention relates to a safe casing, and more particularly, to a casing primarily used to integrate solenoid valve devices and gas ignition controls whereby the volume is diminished to facilitate assembling and ensure the insulation of wiring and the transmission of electrical signals.

2. Description of the Related Art

The known gas control is composed of a casing having an "open space" in one side and an electrical circuit board incorporated into the open space of the casing, as such the gas control can be used for different high-voltage ignition and flame induction of various "gas combustion appliances".

Furthermore, the opening and closing of the known solenoid valve, no matter whether it is of the normally-open type or normally-closed type, are enabled through the conduction of coils, and then control the gas to flow.

As said known solenoid valve and said known gas control are two independent bodies and the electrical signals of the valve should be supplied by the control for constructing an integral safety control mechanism, the insulation of the wiring between these two independent bodies is liable to be damaged by the high temperature generated from water heaters or bug bites due to exposure. Or the poor contact of wiring connectors is liable to be caused by moisture and oxidization due to exposure. As such, the safety control of gas appliances is jeopardized.

Secondly, said known gas control can only connect to a single solenoid valve with a design of single gas intake such that it can control the opening/closing of gas flow but not the intake of gas and/or increase the gas flow rate.

Thirdly, the high-voltage, high-current AC power supply widely used in most countries in the world is liable to cause the danger of air explosion when ignition. Since realizing the known defects, the inventor of the present invention has been devoted to the study and design, and finally, brings forth the present invention having a reasonable design and able to exterminate said defects effectively.

SUMMARY OF THE INVENTION

It is therefore a primary object of the present invention of "safe casing" to utilize the casing to integrate gas ignition control and solenoid valve devices for placing the wiring therein into the sealed space of the casing for well maintaining the insulation of the wiring and the transmission of electrical signals, using the solenoid valve as a safety mechanism, and diminishing the total volume of these two independent bodies the gas ignition control and the solenoid valve to facilitate assembling.

Another object of the present invention is to exterminate the defect found in the known gas control that has only the function of controlling the opening/closing of the gas outlet, and further add to such a control with the function of controlling the flow rate of such outlet.

A further object of the present invention is to effectively avoid the possible danger of air explosion when ignition by means of the design of low-voltage and low-current control circuit.

For achieving above objects, the present invention provides a safe casing comprising a casing having an open space in one side, a solenoid valve device installed in a place of the open space, a low-voltage, low-current control circuit device installed in another place of the open space and a means for sealing. The open space of the casing is sealed by use of said means after it is installed with the devices of solenoid valve and circuit control.

For the examiners to further understand the characteristics and technology of the present invention, the detailed description and drawings of the invention are attached hereinafter for ready reference.

DESCRIPTION OF THE PREFERRED EMBODIMENT

Figure 1:
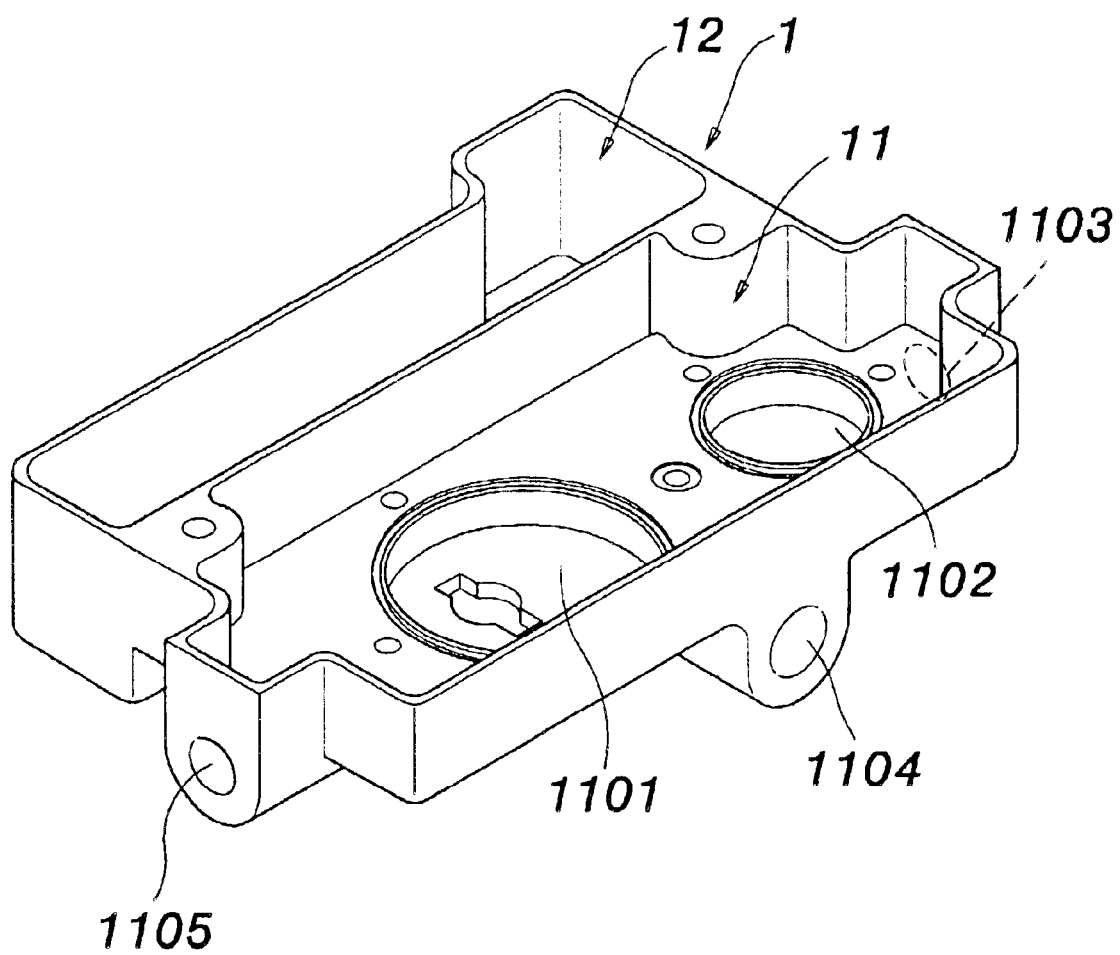
FIG. 1 is a perspective view of the casing of the invention.
Figure 3:
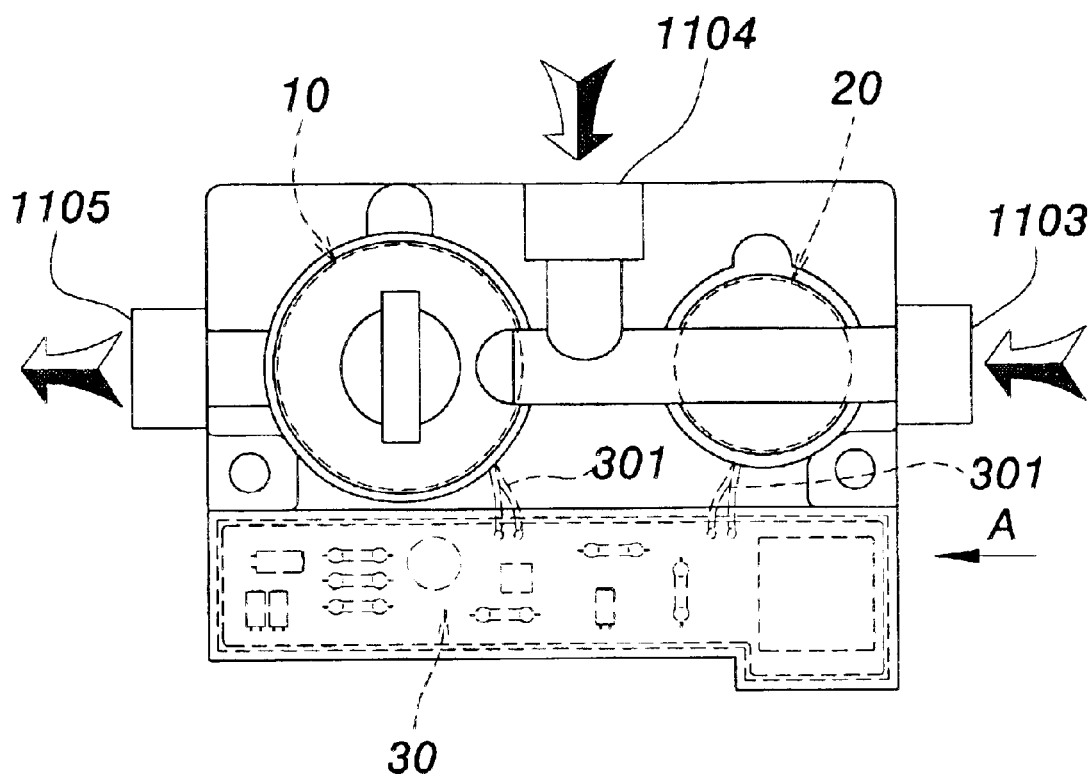
FIG. 3 is a top view of the invention after installation.

Please refer to FIG. 1 and 3. The safe casing of the present invention comprises a casing 1, a main solenoid valve device 10, an auxiliary solenoid valve device 20 and a control circuit device 30.

Please refer to FIG. 1. One side of the casing 1 is an open space wherein a first chamber 11 and a second chamber 12 are formed. A first gas intake 1103, a second gas intake 1104 and an gas outlet 1105 as well as a first valve seat 1101 and a second valve seat 1102 are established in the first chamber 11 of such casing 1.

Figure 2:
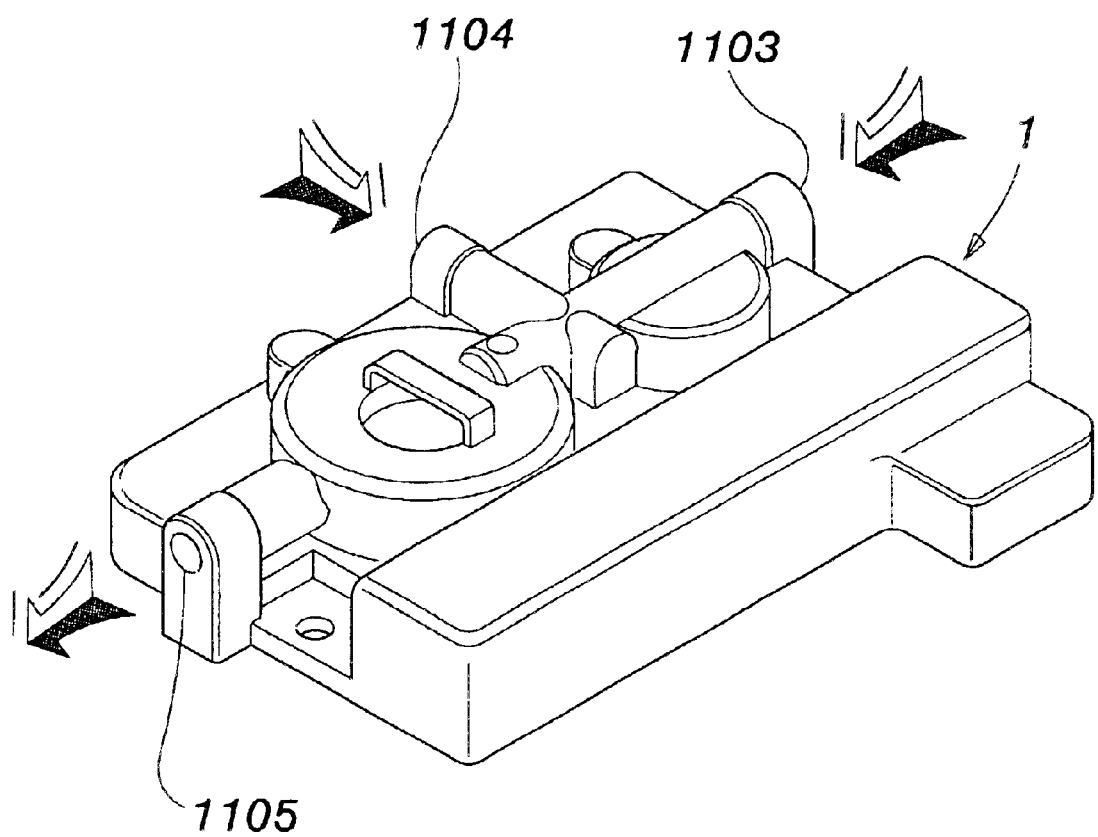
FIG. 2 is another view of the invention after installation.

Please refer to FIG. 2 and 3. The main solenoid valve device 10 is installed in the first valve seat 1101; the auxiliary solenoid valve device 20, in the second valve seat 1102 and the control circuit device 30, in the second chamber 12. These solenoid valves and control circuit devices are installed in the casing 1 at the same time; enabling the wiring 301 therein to be connected in a shortest way without the disorder caused by over-length, and enabling the control circuit device 30 to control these two solenoid valves. FIG. 3 shows that the second gas intake 1104 outputs gases from the outlet 1105 through the main solenoid valve device 10, while the first gas intake 1103 output gases from the outlet 1105 through dual controls of the auxiliary solenoid valve device 20 and the main solenoid valve device 10. By installing two (or more than two) gas intakes and two (or more than two) solenoid valves, the main solenoid valve 10 controls the opening and closing of the outlet 1105 and the auxiliary solenoid valve 20 controls the gas flow rate of the outlet 1105 as described below. When the main solenoid valve device 10 is closed, the first and second gas intakes 1103 and 1104 cannot take the gas. When the main solenoid valve device 10 is open with the auxiliary solenoid valve device 20 closed, the second gas intake 1104 can take the gas and output the gas from the gas outlet 1105 while the first gas intake 1103 can not take the gas. When opening the auxiliary solenoid valve device 20 at this time, the first gas intake 1103 can then take the gas, which converges with the gas entering the second gas intake 1104, hence a greater gas flow rate is output from the outlet 1105.

Figure 4:
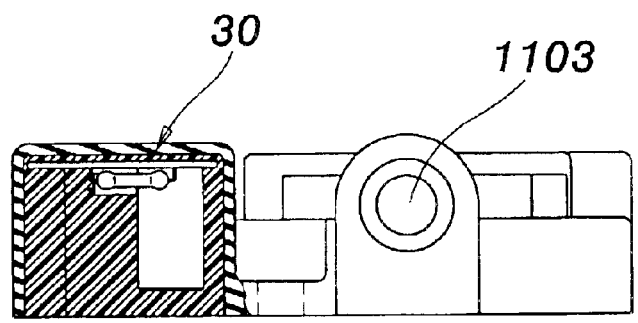
FIG. 4 is partial sectional view of the invention along arrow A of FIG. 3
Figure 5:
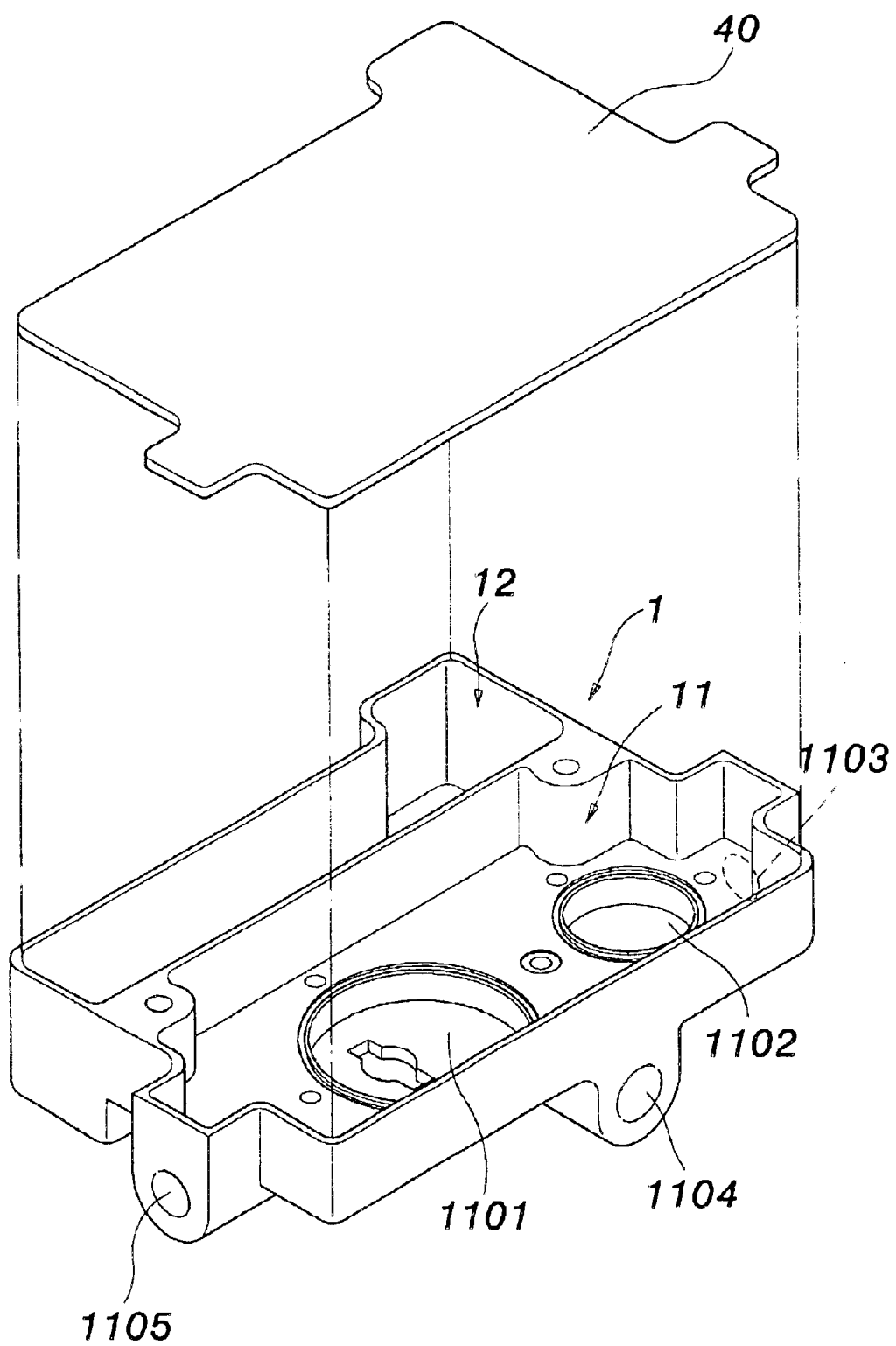
FIG. 5 is a perspective view of the casing and the cover due to another embodiment.

Please refer to FIG. 4. For tightly sealing the casing 1 of the invention, said open space of the casing 1 is poured with resin after installed with the main solenoid valve device 10, the auxiliary solenoid valve device 20 and the control circuit device 30; making these two solenoid valves, the control circuit and the wiring 301 therein totally isolated from the outside without any exposure to the air. Or, as FIG. 5 shows, if pouring of resin is not used, said open space can be covered with a permanent cover 40, which has the same function of sealing the open space tightly. Or, the pouring of resin and the covering of the permanent cover 40 can be applied to the open space to make the sealing tighter and the two solenoid valves, the control circuit and the wiring 301 therein totally isolated from the outside without exposure to the air.

The above-mentioned structure of the present invention designed to incorporate the solenoid valve device and the control circuit device in the casing 1 simultaneously allows the wiring not to be too long. As the invention integrates the solenoid valve device and the gas ignition control (including the control circuit device and the casing), which are sealed by pouring of resin, covering, or pouring with covering, the wiring (layout of electrical wires) is thus placed in the tightly sealed open space of the casing 1, whereby the insulation of wiring and the transmission of electrical signals are ensured, the function of the solenoid valve as a safety mechanism is maintained, the total volume of these two independent bodies of gas control and solenoid valve is diminished and the assembling is facilitated. Because at least two solenoid valves and gas intakes are installed, the gas flow rate is under control in addition to the control of opening/closing of the gas outlet. As the control circuit device is of the low-voltage, low-current type, it can effectively avoid the possible danger of air explosion when ignition.

As described above, the safe casing provided in the present invention can indeed solve the known defects and is therefore a new, high-valued and practical product with increased functions and complying with the requirements for application for patent. The application for patent is henceforth submitted in accordance with Patent Law to protect the interest of the inventor.

The above description is only the one of the preferred embodiments of the present invention; accordingly, it cannot be construed to confine the claims appended to the invention. It is herewith stated that those modified structures having equivalent functions and made according to the descriptions and drawings of the present invention should be included in the appended claims in the present invention.

What is claimed is:

1. A safe casing, comprising:
    a casing having an open space formed in a side thereof, the open space having a first chamber with a first gas intake, a second gas intake and an gas outlet, and a second chamber adjacent to the first chamber;
    two solenoid valves device installed in the first chamber of the open space, and respectively being a main solenoid valve device and an auxiliary solenoid valve device;
    a control circuit device installed in the second chamber of the open space; and
    a sealing means for sealing said casing after the solenoid valve devices and the control circuit device are respectively installed in the open space, the sealing means having a permanent cover covering said open space of said casing;
    wherein the main solenoid valve device controls opening and closing of the gas outlet installed in said casing, and as closing, the second gas intake installed in the casing is unable to take gas;
    wherein the auxiliary solenoid valve device controls opening and closing of the first gas intake installed in said casing, and as opening, the gas flow rate of said gas outlet is able to be increased relatively;
    wherein the gas is output from the gas outlet only when the first gas intake goes through the limitation that the main solenoid valve device and the auxiliary solenoid valve device are open simultaneously.

2. The safe casing as claimed in claim 1, wherein the sealing means seals the casing by pouring of resin after the open space of the casing is installed with the solenoid valve device and the control circuit device.

3. The safe casing as claimed in claim 1, wherein the sealing means has a permanent cover covered the open space of the casing after the open space of the casing is installed with the solenoid valve device and the control circuit device.

* * * * *